June 29, 1948.  R. W. LUCE  2,444,356
RETRODIRECTIVE LIGHT-REFLECTING DEVICE

Filed May 12, 1943

Inventor,
RICHARD W. LUCE.
By George T. Gill
Attorney.

Patented June 29, 1948

2,444,356

UNITED STATES PATENT OFFICE 2,444,356

RETRODIRECTIVE LIGHT-REFLECTING DEVICE

Richard W. Luce, Southport, Conn.

Application May 12, 1943, Serial No. 486,714

1 Claim. (Cl. 88—82)

The invention herein disclosed relates to a retrodirective light-reflecting device of the plaque type, similar to that disclosed and described in the co-pending application, Serial No. 320,267, filed February 23, 1940, for Retrodirective reflecting device which issued as Patent No. 2,319,742, dated May 18, 1943.

In the aforesaid prior application, there is disclosed a retrodirective light-reflecting device that includes a relatively thin sheet of transparent, moldable material. One surface, the rear surface, is a plane surface. The front surface has formed thereon a multiplicity of relatively small, spherical-sector lenses uniformly distributed thereover. On the rear surface there is an opaque light-reflecting medium having different light-reflecting characteristics representing the characters, figures or indicia to be displayed.

An object of this invention is to provide an improved retrodirective, light-reflecting device of this kind. Another object of the invention is to provide a retrodirective, light-reflecting device of this kind in which the opaque, light-reflecting medium may be performed. A further object of the invention is to provide a retrodirective, light-reflecting device of this kind in which the opaque light-reflecting medium is maintained in contact with the rear surface of the plate. An additional object of the invention is to provide such a device in which the light-reflecting medium is protected from the weather.

The foregoing objects and certain advantages that will hereinafter appear are realized in the embodiment of the invention disclosed, by way of an example, in the accompanying drawing and described in detail below.

Figure 1:
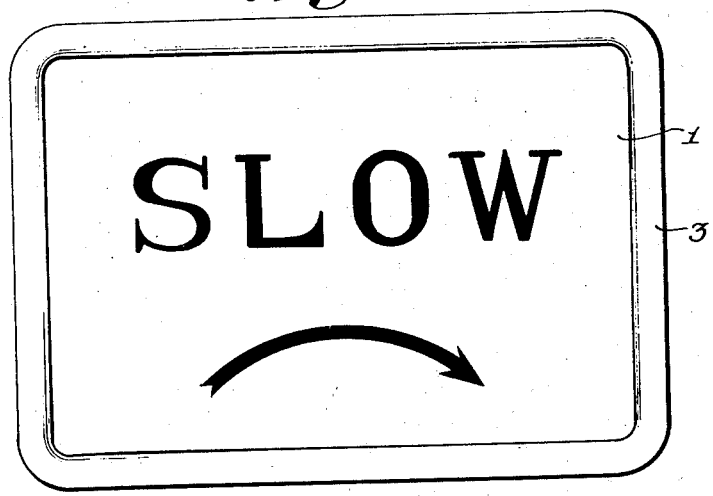
Figure 2:
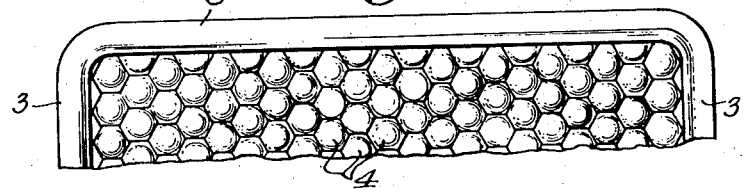
Figure 3:

The drawings include:

Fig. 1 which is a front elevation of a retrodirective, light-reflecting sign constructed in accordance with this invention;

Fig. 2 which is an enlarged, fragmentary front elevation of an end of the same; and Fig. 3 which is an enlarged, fragmentary, transverse section of a form of construction.

The sign illustrated in the drawing is one that is especially suitable for a roadside warning sign. When such a sign is positioned at the side of a road, the light falling thereon from the head lights of an approaching car is returned substantially in the direction of the incident light with sufficient spread to reach the eyes of the driver. At night time, the sign thus appears illuminated and is rendered legible to the driver of the approaching car.

This sign primarily consists of a light-collecting and directing element or plate 1, and an opaque, light reflecting medium 6 behind the front surface and containing the indicia, figures or characters to be displayed. The plate 1 is formed from a moldable, transparent material. Some of the transparent plastics such as "Lucite" and "polystyrene" are especially suitable, and assuming equal weathering qualities, the higher the index of refraction of the material, the more suitable the material, particularly from the standpoint of the amount of material used and therefore the cost.

The plate is preferably formed with a border 3 defining the sign and forming a re-inforcement for the plate. Within the border 3, the front surface of the plate has formed thereon a multiplicity of relatively small, spherical-sector lenses 4. In a retrodirective, light-reflecting device of this kind and suitable for a road side sign, a ninety degree lens aperture is sufficient. Therefore, the lenses 4 are ninety degree sectors of the spheres of which they form a part. The perimeters of the lenses at the front surface of the plate (Fig. 2) are in the form of hexagons and adjacent lenses are in contact so that the lenses cover the entire front surface of the plate within the border 3.

The rear surface 5 of the plate is located in the plane at which each lens effects the greatest concentration of light for paraxial incident rays, or rays from a point source at infinity. In the plate illustrated, the rear surface 5 is slightly roughened, comparable to the surface of a ground glass surface. This, for certain purposes, provides a better bonding surface and the slight dispersion of the light is not objectionable. Against the rear surface, and in intimate contact therewith throughout the area behind the lenses, there is a sheet of opaque, light-reflecting material 6 having areas of different light-reflecting characteristics. In the sign illustrated, the sheet of opaque light-reflecting material 6 is a sheet of paper having the letters of the word "Slow" and the curved arrow printed thereon. The letters and figures are, of course, printed in a color different from the color of the paper which forms the background of the sign. Preferably, the sheet 6 is pressed against the rear surface 5 under pressure and while heat is applied to the plate. In this way, all air is eliminated from between the sheet and the plate and the sheet, at all points, and throughout the entire area is in direct and intimate contact with the surface.

In a sign of this kind, the lenses 4 should be of such size and so closely related to sharply define in the reflected light without observable distortion transitions in the light-reflecting characteristics of the light-reflecting medium. To this end, the lenses in the sign illustrated are sectors of spheres of a radius of curvature of less than one-thirty-second ($\frac{1}{32}$) of an inch. When "polystyrene," which has an index of refraction of one and six tenths (1.6), is used the lenses may be sectors of spheres of a radius of curvature of three one hundred and twenty-eighths ($\frac{3}{128}$) of an inch and the thickness of the plate including the lenses, to the rear surface 5, is approximately 0.056 of an inch. With this relation, the rear surface 5 and the surface of the sheet 6 are located in the plane at which the lenses effect the greatest concentration of light for paraxial rays incident thereon.

In the sign illustrated the sheet 6 of opaque light-reflecting material having the characters formed thereon is embedded in the moldable material. Two plain sheets of the moldable, transparent material are used, each of which is larger than the opaque sheet 6. One of the sheets, which may be thinner than the other, is placed in a mold and the sheet 6 of opaque material is laid thereon in proper relation thereto and with the rear surface thereof against the sheet of moldable material. The other sheet of moldable material is then placed in the mold on top of the sheet of opaque material. A mold, having a configuration complementary to the desired front surface is brought into contact with the assembled sheets. Heat and pressure is then applied and simultaneously the lenses 4 and border 3 are formed on the front surface.

Where the sign has a large area, it may be desirable to effect a fusing of the two sheets of moldable material at various points throughout the area. The sheet 6, is perforated at various points, such as at 7. The material of the moldable sheets enters these perforations and is fused together at such points. They are also fused together as at 8 outside the edges of the sheet of opaque material.

It will be obvious that various changes may be made by those skilled in the art in the details of the embodiments of the invention illustrated in the drawings and described above within the principle and scope of the invention as expressed in the appended claim.

I claim:

A retrodirective, light-reflecting device of the kind described comprising in combination a relatively thin plate of moldable transparent material having a plurality of light-collecting lenses on the front surface and uniformly distributed thereover, a sheet of opaque light-reflecting material completely embedded in the plate and having spaced openings therethrough through which reenforcing projections of the material of the plate extend, the opaque medium extending parallel to the front surface of the plate and positioned at the plane of the greatest concentration of light received by the lenses from a point source at infinity.

RICHARD W. LUCE.

REFERENCES CITED

The following references are of record in the file of this patent:

UNITED STATES PATENTS

| Number | Name | Date |
|---|---|---|
| 1,863,819 | Willwerschied | June 21, 1932 |
| 1,959,090 | Wood | May 15, 1934 |
| 2,036,146 | Kampfer | Mar. 31, 1936 |
| 2,039,998 | Hollister | May 5, 1936 |
| 2,054,289 | Jackson | Sept. 15, 1936 |
| 2,149,171 | Grote | Feb. 28, 1939 |
| 2,167,149 | Grote | July 25, 1939 |
| 2,181,926 | Tiger | Dec. 5, 1939 |
| 2,213,708 | Lange | Sept. 3, 1940 |
| 2,231,139 | Reininger | Feb. 11, 1941 |
| 2,319,014 | Smith | May 11, 1943 |
| 2,319,742 | Luce | May 18, 1943 |
| 2,326,634 | Gebhart | Aug. 10, 1943 |
| 2,343,068 | Luce | Feb. 29, 1944 |

FOREIGN PATENTS

| Number | Country | Date |
|---|---|---|
| 777,907 | France | Dec. 15, 1934 |
| 456,398 | Great Britain | Nov. 9, 1936 |